United States Patent [19]

Adams, IV

[11] 4,349,927
[45] Sep. 21, 1982

[54] BEEHIVE IMPROVEMENTS

[76] Inventor: John Q. Adams, IV, 1206 Foxcroft Rd., Richmond, Va. 23229

[21] Appl. No.: 236,112

[22] Filed: Feb. 19, 1981

[51] Int. Cl.³ ............................................. A01K 47/00
[52] U.S. Cl. .................................................. 6/1; 6/10
[58] Field of Search .................. 6/1, 2 R, 2 A, 8, 10, 6/11

[56] References Cited

U.S. PATENT DOCUMENTS

| 85,716 | 1/1869 | Wright | 6/2 R |
|---|---|---|---|
| 143,383 | 9/1873 | Rasey | 6/10 |
| 391,162 | 10/1888 | Kendall | 6/2 R |
| 2,162,413 | 6/1939 | Wisniewski | 6/2 R |
| 2,458,838 | 1/1949 | Dunham | 6/10 |
| 3,439,364 | 4/1969 | Paoletti | 6/10 X |

FOREIGN PATENT DOCUMENTS

| 1112037 | 3/1956 | France | 6/10 |
|---|---|---|---|
| 2458215 | 2/1981 | France | 6/1 |
| 77742 | 11/1950 | Norway | 6/1 |
| 728803 | 4/1980 | U.S.S.R. | 6/1 |

Primary Examiner—Gene Mancene
Assistant Examiner—Robert P. Swiatek
Attorney, Agent, or Firm—B. P. Fishburne, Jr.

[57] ABSTRACT

A Kenya hive is modified to accept on top thereof at one end portion of the Kenya hive a Langstroth hive. Better wintering of bees in colder climates is thus achieved while retaining the known advantages of the Kenya hive. Modified forward brood frames and frame spacers enable the mounting of the Langstroth hive with stability on this portion of the Kenya hive. Modifications of the rear honey frames and top bars improve the efficiency of the Kenya hive and reduce its manufacturing cost. Other improved constructional features are disclosed.

4 Claims, 19 Drawing Figures

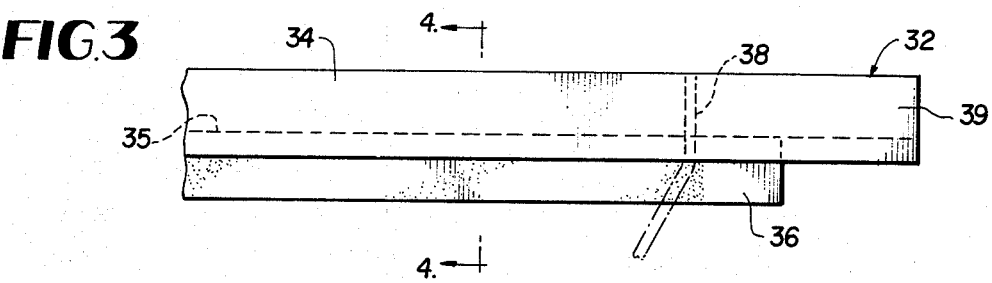
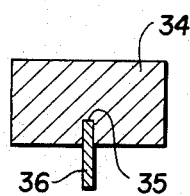
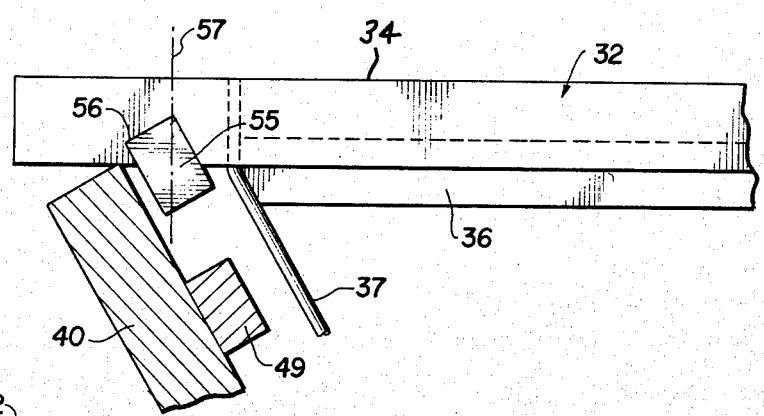
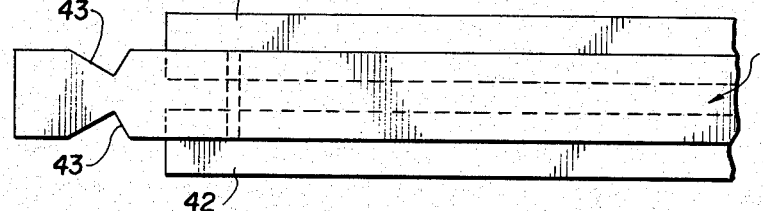
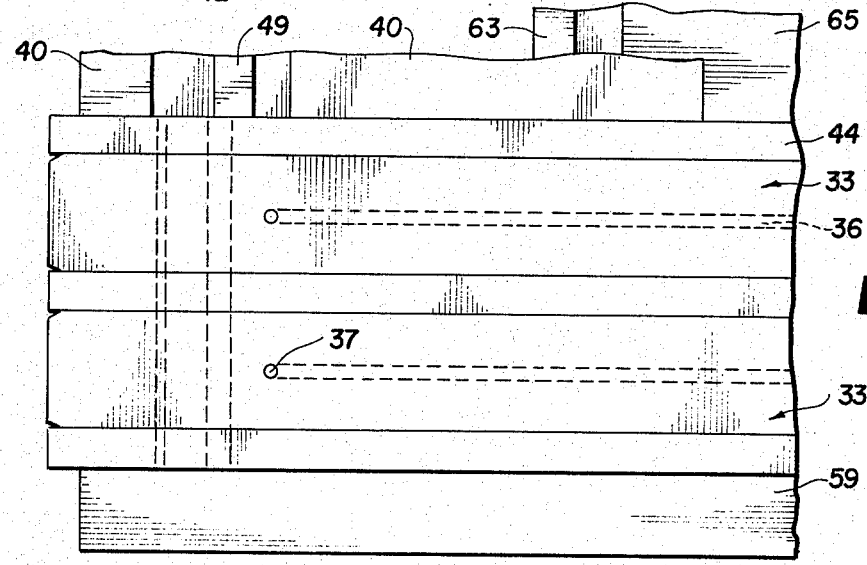

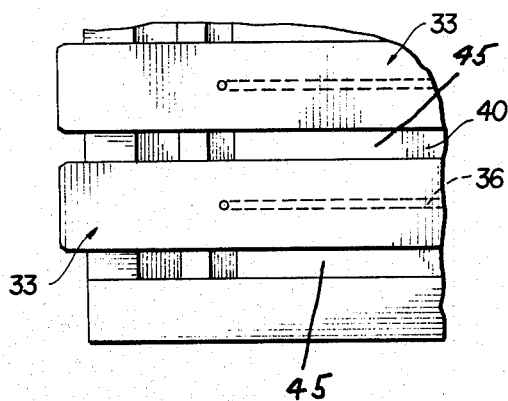
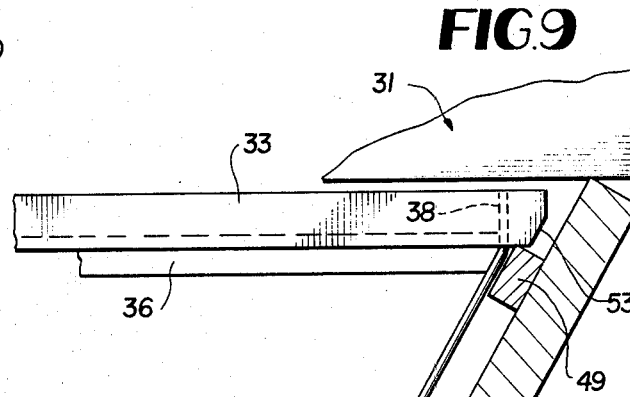
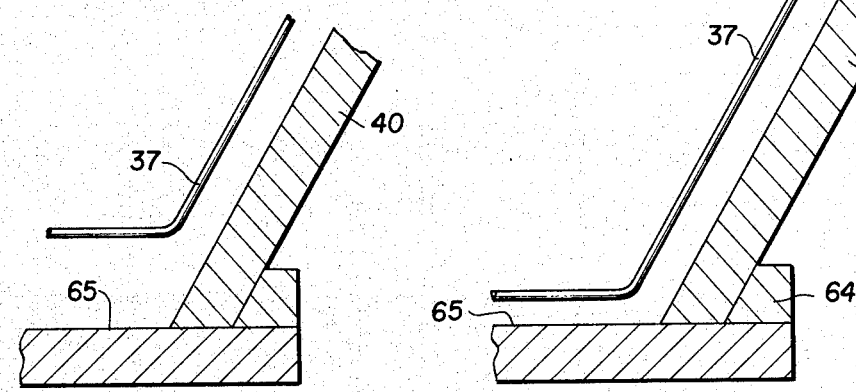
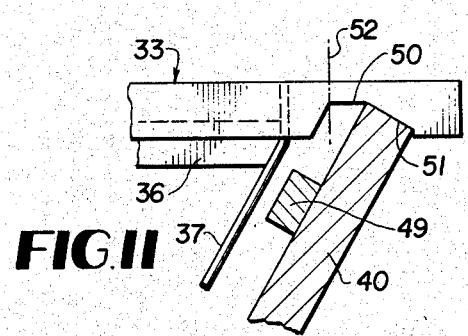
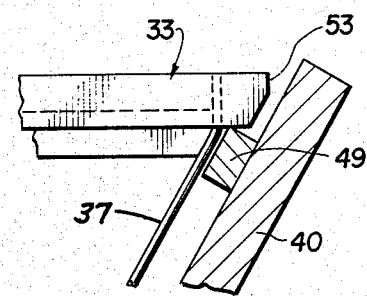
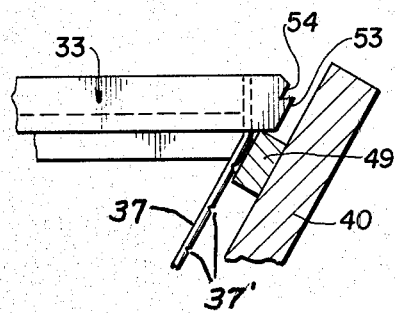

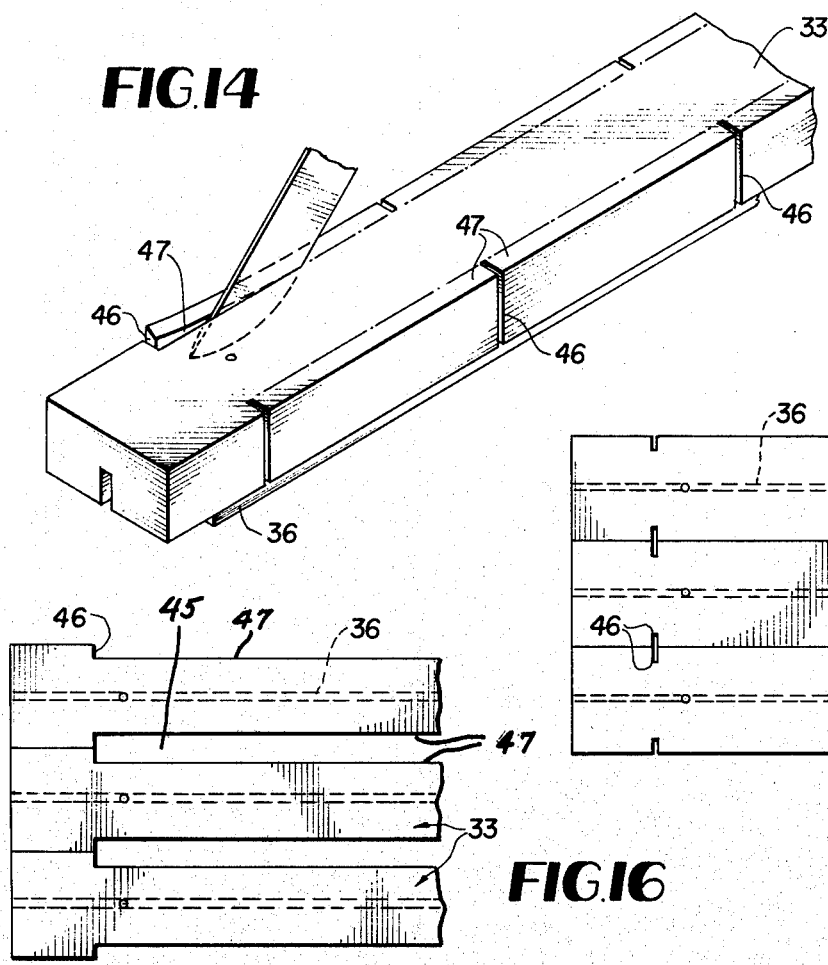

BEEHIVE IMPROVEMENTS

BACKGROUND OF THE INVENTION

U.S. Pat. No. 4,135,265 discusses the merits of the Langstroth hive which is stated to be the most significant advance in beekeeping in the last century. The Langstroth hive is rather intricate in construction and comparatively costly but is an excellent hive.

The much simpler and far less costly Kenya hive, suitable for warmer climates, also known as the Knya top bar hive, is discussed in a report entitled "Apiculture in Tropical Climates", October, 1976, by International Bee Research Association, Hill House, Gerrards Cross, Bucks SL9 ONR, England. The Kenya hive is also described in publications by Dr. Maurice Smith, University of Geulph, Guelph, Ontario, Canada.

The objective of the present invention is to provide an improved hive suitable for all climates which represents a combining or "marriage" of the Kenya and Langstroth hives. By virtue of this combining, the low cost and convenience of the Kenya hive can be retained while the superimposed Langstroth equipment on the forward or brood frame end of the Kenya hive enables the safe wintering of bees in colder climates.

In accomplishing the stated objective of the invention, many improvement constructional features in the basic Kenya hive are employed to further reduce its cost of manufacturing and its efficiency while adapting it to the stable supporting of the wintering Langstroth equipment on one end portion thereof.

The many features and advantages of the invention will become apparent during the course of the following detailed description.

BRIEF DESCRIPTION OF THE DRAWINGS

FIG. 3 is a fragmentary side elevation of a rear honey frame and starter foundation strip assembly.

FIG. 4 is a transverse vertical section taken on line 4—4 of FIG. 3.

FIG. 5 is a view similar to FIG. 3 showing a front brood frame.

FIG. 6 is a view similar to FIG. 3 showing a modification.

FIG. 7 is a fragmentary plan view of the front or brood portion of the Kenya hive.

FIG. 8 is a view similar to FIG. 7 without the brood frame spacers of FIG. 7.

FIG. 9 is a fragmentary transverse vertical section taken through the front or brood portion of the Kenya hive.

FIG. 10 is a view similar to FIG. 9 showing the position of wire frames with the Langstroth hive in use.

FIG. 11 is a fragmentary view showing another method of supporting frames on the Kenya hive.

FIG. 12 is a view similar to FIG. 11 showing the frame of FIG. 11 modified by cutting to permit use with Langstroth equipment.

FIG. 13 is a similar view showing further modifications.

FIG. 14 is a fragmentary perspective view of a further modified form of brood frame.

FIG. 15 is a plan view of frames according to FIG. 14 in use without Langstroth equipment.

FIG. 16 is a similar view of frames according to FIG. 14 in use with Langstroth equipment.

FIG. 17 is a view similar to FIG. 16 showing a further modification.

FIG. 18 is a view similar to FIG. 17 without the spacer bars of FIG. 17.

FIG. 19 is an enlarged transverse vertical section taken on line 19—19 of FIG. 17.

DETAILED DESCRIPTION

Figure 1:
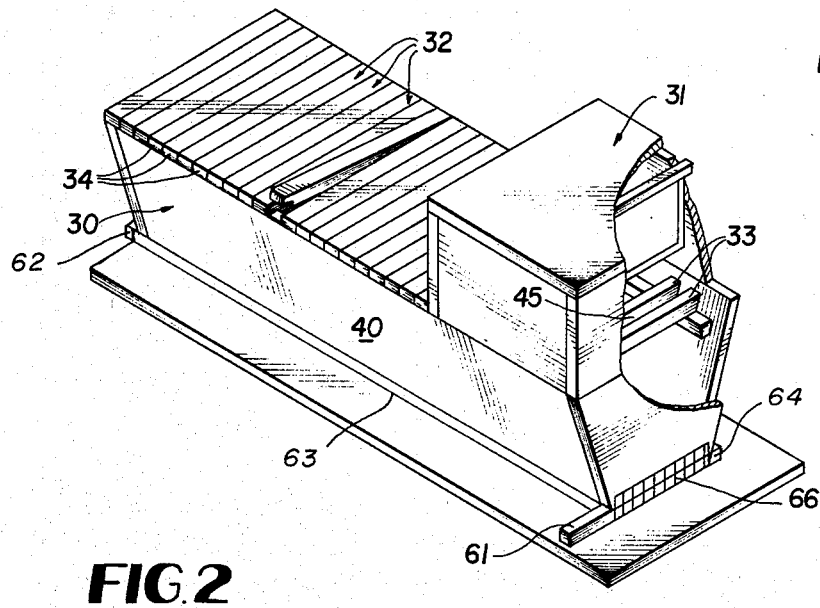
FIG. 1 is a perspective view of the invention.
Figure 2:
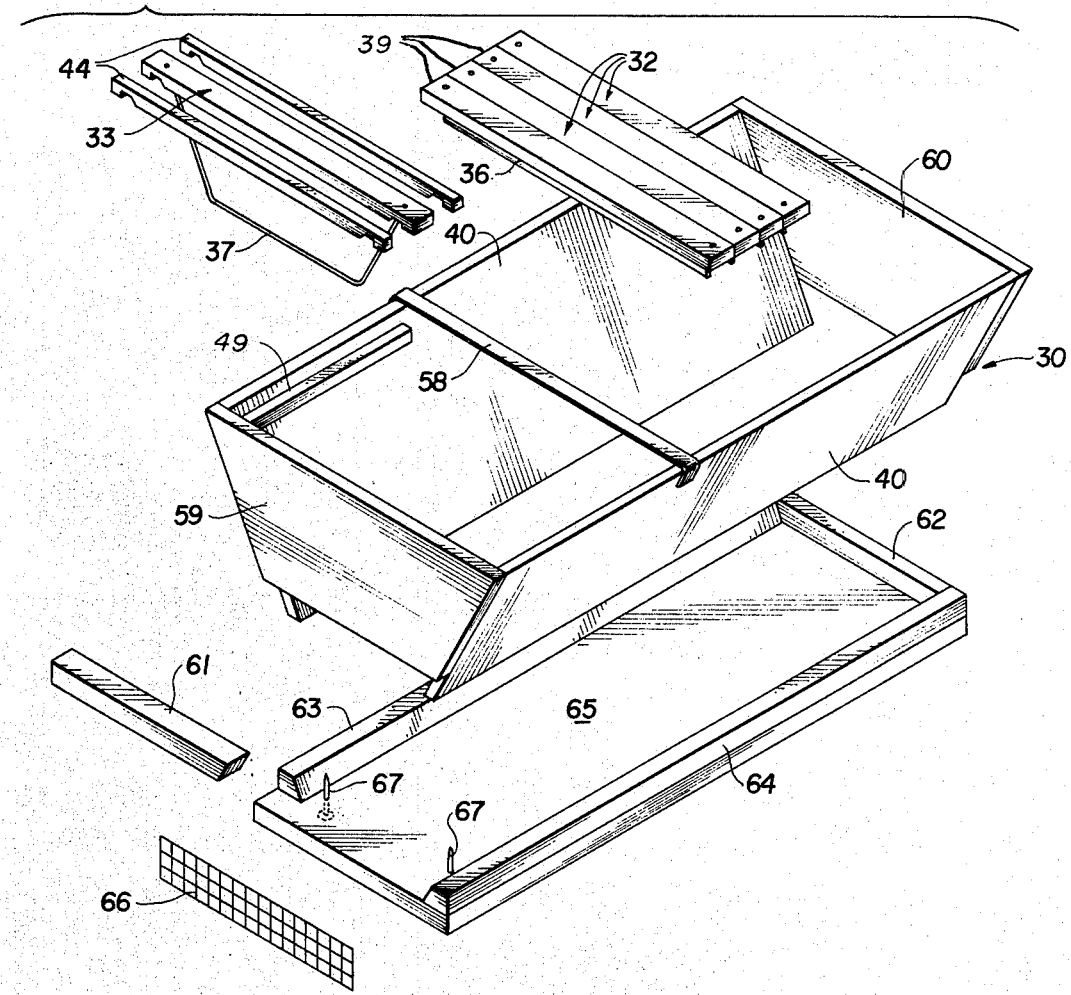
FIG. 2 is an exploded perspective view of the modified Kenya hive, parts omitted.

Referring to the drawings in detail wherein like numerals designate like parts, a modified Kenya hive 30 is made somewhat wider than the traditional Kenya hive discussed in the above literature simply to accommodate on the forward end portion thereof in superposed relationship a Langstroth hive unit 31 of conventional construction. As stated previously, this combining the Kenya hive and Langstroth hive into a single unit enables the successful use of the highly convenient and low cost Kenya hive in cold climates because the elevated Langstroth hive 31 provides a comparatively safe wintering space for the bees.

To a great extent, this invention deals with modifications and improvements in the construction of the Kenya hive 30 which render its association with the Langstroth hive in the manner shown both feasible and practical.

More particularly, the modified Kenya hive comprises a plurality of rear honey frames 32 whose details will be described and which represent the greater number of frames in the entire hive. A lesser number of forward or brood frames 33 are contained in the forward end portion of the Kenya hive 30 directly beneath the superposed wintering Langstroth hive 31.

Each honey frame 32 has its top bar 34 grooved throughout its length and on its bottom at its transverse center as shown at 35. Such a groove can be cut by a saw. A narrow starter foundation strip 36, either waxed or unwaxed, is pressed into the longitudinal groove 35 and will remain therein by friction. This starter strip encourages comb propagation.

Optionally, a wire perimeter frame element 37 can be utilized on all honey and brood frames 32 and 33. The upper terminals of the wire frame 37 are held within drilled openings 38 in the top bars of the honey and brood frames. The top bars 34 of rear honey frames 32 can have their end portions 39 resting on the top edges of sloping side walls 40 of the Kenya hive 30. The ends of starter strips 36 lying inwardly of side walls 40 will tend to center the rear honey frames on the Kenya hive. A somewhat more sophisticated form of rear honey frame 41, FIG. 6, includes starter foundation strips 42 mounted in grooves formed in the top and bottom of the frame top bar, whereby the honey frame is rendered reversible following the formation and removal of a full honeycomb on one side thereof, the propagation of such comb beginning on one strip 42.

Additionally, pairs of locator notches 43 can be provided in the end portions of each frame 41, top and bottom, to engage with the top edges of side walls 40 in order to center the honey frames with greater precision. The wire elements 37, if desired, can also be employed in the manner described on each frame 41.

The top bars of rear frames 32 and 41 are all of equal width, preferably 1⅜ inches, while the top bars of forward brood frames 33 are preferably 1 inch wide each and intervened by ⅜ inch spacer bars 44, to be further discussed. As shown in FIG. 1, the top bars 34 during use are in contact to form a continuous hive roof which can be covered by roofing paper or the like. When the Langstroth hive 31 is being utilized as for wintering the bees, the spacer bars 44 are removed and the customary ⅜ inch bee spaces 54 are provided between the top bars of the front or brood frames 33 which are beneath the Langstroth equipment. If conditions dictate non-use of the Langstroth equipment 31, then the spacer bars 44 are put in place between the brood frame top bars and the hive becomes a more-or-less conventional Kenya hive.

The spacer bars 44 can be nailed to the top bars of frames 33 for greater security. Variations in the spacing arrangement of the frames 33 are possible as shown particularly in FIGS. 14 through 19. In FIG. 14, the side walls of the top bars of frames 33 can first be grooved as at 46 with a saw blade and the wood between these grooves can be cut or chiseled away to form long side recesses 47 in the spacer top bars. Spacer strips 48 of required thickness can be pressed into the recesses 47 to fill up the latter, FIG. 17, as where the frames are to be employed without the Langstroth hive 31 and hence without bee crawl spaces 45 between adjacent frames. FIGS. 16 and 18, like FIG. 8, show the frames 33 without the spacer inserts 48, therefore providing the crawl spaces 45 when the Langstroth equipment is being used. FIG. 15 shows frames according to FIG. 14 prior to cutting away the wood between the grooves 46, as where the frames are in side-by-side contact without the Langstroth equipment.

The end portions of rear honey frame top bars 34 can rest on the top edges of side walls 40, as stated, or the locator recesses shown in FIG. 6 can be utilized. The top bars of front brood frames 33 are designed to have their end portions sawed off so that they can rest on support strips 49, FIGS. 5, 9 and 11 through 13, attached to the interior faces of inclined side walls 40. This places the tops of brood frames 33 below the top edges of side walls 40 so that the Langstroth unit 31 may rest on the top edges without interference from the underlying brood frames.

As shown in FIG. 11, the top bars of frames 33 near their ends can be provided with recesses 50 to support and locate the frames on the inclined top edges 51 of side walls 40, as where the Langstroth equipment is not being used. These same top bars can have their ends cut off vertically at 52 whereby the resulting foreshortened ends 53, FIG. 12, can rest on the support strips 49, again to allow use of the Langstroth equipment on top of the basic Kenya hive. For further convenience, FIG. 13, lifting notches 54 can be provided in the frame top bars to be engaged by a suitable hive tool. Also shown in this figure are an optional series of notches 37' provided at equally spaced intervals along the exterior of the wire perimeter frame 37 to encourage the adherence of the honeycomb.

Another variation is shown in FIG. 5, where a locator lug 55 for the frame 32 is snugly held in a recess 56 formed in each end portion of the frame top bar 34 to locate the frame laterally between side walls 40 in lieu of the notches 43. The end portions of such frame top bars can still be sawed off on lines 57 and the remaining parts of locator lugs 55 removed to allow supporting of the frames on the strips 49. These various constructional features enable the use of precut standard length wood components in making the top bars of both rear and front frames 32 and 33. Minimum wasting of wood is achieved as well as very economical fabrication of parts. It should be noted that about nine or ten of the front brood frames 33 without spacer bars are employed when the Langstroth unit 31 is required. However, the number of front frames is not critical and can be varied. This is also true concerning the number of rear frames 32, as the length of the Kenya hive 30 can be varied.

A further feature of the invention is involved in the construction of the body of the Kenya hive 30. Preferably, a cross brace 58 is installed near the rear wall of the Langstroth unit to resist buckling of the side walls 40 under the resulting load.

The end walls 59 and 60 of the Kenya hive body are initially cut to the same size in a trapezoidal shape. Bar elements 61 and 62 can then be cut from the bottoms of end walls 59 and 60.

The sloping side walls 40 are initially cut to the same size and strips 63 and 64 are cut from their lower edges. The angles at which these two strips are cut off will provide opposing surfaces to mate with the outer faces of the side walls and center the latter on a bottom board 65 of the hive to which the elements 62, 63 and 64 are attached as by nailing. The elements 62, 63 and 64 prevent the hive body from sliding laterally and rearwardly on the board 30.

The bar elements 61 is used as a sliding closure or winter stick, as shown in FIG. 1. The strip 63 has one end foreshortened to accommodate this winter stick and the opposing strip 64 serves as a stop. A mouse guard 66 in the form of a heavy screen section is utilized and assists in guiding the winter stick. Forward displacement of the hive body can be prevented by placing two nails 67 in the lower edges of side walls 40.

It should now be clear to those skilled in the art that the invention provides many conveniences and economies not heretofore provided. Most importantly, the invention enables the use of the economical, convenient and very simplified Kenya hive in colder climates where it customarily cannot be used. This is accomplished in the invention by the successful adaptation of the Kenya hive to the support of a Langstroth hive unit at the brood end portion of the Kenya hive.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A beehive comprising a bottom board having a pair of side longitudinal locator strips fixed thereto in parallel relationship and having one end transverse locator strip fixed thereto between the longitudinal locator strips, the longitudinal locator strips having interior longitudinal inclined faces, a hive body portion comprising connected vertical end walls which are trapezoidal and downwardly tapering and side walls which are inclined and downwardly convergent and adapted to engage matingly between the inclined faces of the longitudinal locator strips on the bottom wall, an overhead hive section resting bodily on the top edges of the inclined side walls of the hive body portion at one end portion of the latter, brood frames within the hive body portion beneath the overhead hive section and having transversely extending top bars, depressed support strips for the opposite ends of the top bars fixed to the interior surfaces of said side walls below the top edges thereof and disposed beneath the overhead hive section whereby the top bars of said brood frames are supported at an elevation below the bottom of the overhead hive section, said top bars being recessed in their opposite sides to form bee crawl spaces between the top bars when the latter are placed in side-by-side contacting relationship, whereby bees may travel from the brood frames in the hive body portion to the overhead hive section and vice-versa, filler strips for the recesses of the top bars to close said crawl spaces thereby enabling the hive body portion to be used alone without the overhead hive section, and honey frames within the remainder of the hive body portion beyond the overhead hive section and having top bars whose opposite ends rest on the top edges of the inclined side walls of the hive body portion.

2. A beehive as defined in claim 1, and a sliding transverse closure strip for one end of the hive body portion on said bottom board at the end of the bottom board remote from the transverse locator strip.

3. A beehive as defined in claim 2, and each honey frame having a wire border frame element attached to and depending from said top bar and being contoured to follow the cross sectional shape of the hive body portion.

4. A beehive as defined in claim 3, and a short foundation strip on which beeds can build a honeycomb dependingly secured to said top bar within the confines of the wire border frame.

* * * * *